US011117998B2

(12) United States Patent
Araki et al.

(10) Patent No.: US 11,117,998 B2
(45) Date of Patent: Sep. 14, 2021

(54) ONE-PART MOISTURE-CURABLE POLYURETHANE COMPOSITION

(71) Applicant: The Yokohama Rubber Co., LTD., Tokyo (JP)

(72) Inventors: Kiminori Araki, Hiratsuka (JP); Kazunori Ishikawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 123 days.

(21) Appl. No.: 16/465,533

(22) PCT Filed: Nov. 17, 2017

(86) PCT No.: PCT/JP2017/041511
§ 371 (c)(1),
(2) Date: May 30, 2019

(87) PCT Pub. No.: WO2018/101087
PCT Pub. Date: Jun. 7, 2018

(65) Prior Publication Data
US 2019/0284327 A1  Sep. 19, 2019

(30) Foreign Application Priority Data

Nov. 30, 2016  (JP) .............. JP2016-233299

(51) Int. Cl.
C08G 18/10  (2006.01)
C08G 18/18  (2006.01)
C08G 18/30  (2006.01)
C08G 18/38  (2006.01)
C09J 11/04  (2006.01)
C09J 11/06  (2006.01)
C09J 175/04 (2006.01)
C09J 175/08 (2006.01)
C08G 18/76  (2006.01)
C08G 18/48  (2006.01)
C08G 18/24  (2006.01)
C08G 18/20  (2006.01)
C08G 18/12  (2006.01)

(52) U.S. Cl.
CPC ............. *C08G 18/10* (2013.01); *C08G 18/12* (2013.01); *C08G 18/18* (2013.01); *C08G 18/2018* (2013.01); *C08G 18/244* (2013.01); *C08G 18/30* (2013.01); *C08G 18/307* (2013.01); *C08G 18/388* (2013.01); *C08G 18/4812* (2013.01); *C08G 18/4825* (2013.01); *C08G 18/4829* (2013.01); *C08G 18/7678* (2013.01); *C09J 11/04* (2013.01); *C09J 11/06* (2013.01); *C09J 175/04* (2013.01); *C09J 175/08* (2013.01)

(58) Field of Classification Search
CPC ........ C08G 18/10; C08G 18/12; C08G 18/18; C08G 18/2018; C08G 18/244; C08G 18/30; C08G 18/307; C08G 18/388; C08G 18/4829; C08G 18/4825; C08G 18/7678; C09J 11/04; C09J 11/06; C09J 175/04; C09J 175/08
See application file for complete search history.

(56) References Cited

FOREIGN PATENT DOCUMENTS

| JP | H03-188120 | 8/1991 |
| JP | H05-117619 | 5/1993 |
| JP | 2001-348416 | 12/2001 |
| JP | 2002-030131 | 1/2002 |
| JP | 2008-038019 | 2/2008 |

OTHER PUBLICATIONS

International Search Report for International Application No. PCT/JP2017/041511 dated Jan. 23, 2018, 4 pages, Japan.

*Primary Examiner* — Patrick D Niland
(74) *Attorney, Agent, or Firm* — Thorpe North & Western

(57) ABSTRACT

The present technology provides a one-part moisture-curable polyurethane composition excellent in long-term adhesion against weather resistance and vibration. According to the embodiment of the present technology, a one-part moisture-curable polyurethane composition includes: a urethane prepolymer having an isocyanate group; a morpholine compound having one morpholine ring; and an ether compound having two dimethylamino groups.

20 Claims, No Drawings

ONE-PART MOISTURE-CURABLE POLYURETHANE COMPOSITION

TECHNICAL FIELD

The present technology relates to a one-part moisture-curable polyurethane composition.

BACKGROUND ART

In the related art, a one-part moisture-curable polyurethane composition has been used as a sealing agent, an adhesive, and the like for automobile, construction, and structure.

Japan Unexamined Patent Publication No. 2001-348416 aims to provide a moisture-curable polyurethane composition which has excellent adhesion to glass, metal, plastic, painted steel sheet, or the like without using a primer, and also has excellent curability and storage stability, and discloses a moisture-curable polyurethane composition including (A) a urethane prepolymer, (B) at least one silane compound selected from the group consisting of (B-1) a silane compound obtained by adding a compound, to which an aromatic ring or a derivative thereof are directly bonded, to a reactant of at least one selected from the group consisting of xylene diisocyanate, 1,3- or 1,4-di(isocyanatemethyl) cyclohexane, and derivatives thereof with three or more active hydrogens and a nitrogen atom in a secondary aminoalkoxysilane and (B-2) a silane compound having a lysine skeleton obtained by adding a compound to which an aromatic ring or derivatives thereof are directly bonded, to a lysine isocyanate having two or three isocyanate groups and a nitrogen atom in a secondary aminoalkoxysilane, (C) at least one type of a tertiary amine-based catalyst having a morpholine structure and/or a dimethylamino group structure, and (D) an organotin-based compound.

In such a case, the present inventors have found, by referring to Japan Unexamined Patent Publication No. 2001-348416, that as a result of preparing a composition containing a urethane prepolymer and at least one of a tertiary amine-based catalyst having a morpholine structure and/or a dimethylamino group structure and evaluating the composition, long-term adhesion of the composition against weather resistance and vibration may be degraded.

SUMMARY

The present technology provides a one-part moisture-curable polyurethane composition excellent in long-term adhesion against weather resistance and vibration.

As a result of intensive studies, the present inventors have found that desired effects can be obtained by using a morpholine compound having one morpholine ring for a composition containing a urethane prepolymer having an isocyanate group and an ether compound having two dimethylamino groups.

The present technology provides the following features.

1. A one-part moisture-curable polyurethane composition includes: a urethane prepolymer having an isocyanate group; a morpholine compound having one morpholine ring; and an ether compound having two dimethylamino groups.

2. In the one-part moisture-curable polyurethane composition described in the above 1, a content of the morpholine compound is from 0.02 to 1.6 parts by mass with respect to 100 parts by mass of the urethane prepolymer, and a content of the ether compound is from 0.002 to 0.16 parts by mass with respect to 100 parts by mass of the urethane prepolymer.

3. In the one-part moisture-curable polyurethane composition as described in the above 1 or 2, the morpholine compound is dimethylaminoethyl morpholine.

4. In the one-part moisture-curable polyurethane composition described in any one of the above 1 to 3, the ether compound is bis(dimethylaminoethyl) ether.

5. The one-part moisture-curable polyurethane composition described in any one of the above 1 to 4 further includes at least one organophosphorus compound selected from the group consisting of a phosphite compound, a phosphonite compound, a phosphinite compound, and a phosphine compound.

6. In the one-part moisture-curable polyurethane composition described in the above 5, a content of the organophosphorus compound is from 0.01 to 1.0 part by mass with respect to 100 parts by mass of the urethane prepolymer.

7. In the one-part moisture-curable polyurethane composition as described in the above 5 or 6, the organophosphorus compound is triphenylphosphine.

The one-part moisture-curable polyurethane composition according to the embodiment of the present technology has excellent long-term adhesion against weather resistance and vibration.

In the present specification, the long-term adhesion against the weather resistance and vibration may be referred to as adhesion.

DETAILED DESCRIPTION

Embodiments of the present technology are described in detail below.

Note that in the present specification, numerical ranges indicated using "(from) . . . to . . . " include the former number as the lower limit value and the latter number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, it is said that the effect of the present technology is more excellent in the long-term adhesion against the weather resistance and vibration.

One-Part Moisture-Curable Polyurethane Composition

A one-part moisture-curable polyurethane composition according to an embodiment of the present technology (composition according to an embodiment of the present technology) includes a urethane prepolymer having an isocyanate group, a morpholine compound having one morpholine ring, and an ether compound having two dimethylamino groups.

The composition according to an embodiment of the present technology is thought to achieve desired effects as a result of having such a configuration.

The inventors infer the reason as follows.

The inventors consider that a material (a composition containing a urethane prepolymer) having high thixotropy is excellent in bead moldability, but is hardly wetted to a base material (adherend) and has low adhesion.

In addition, the present inventors consider that a difference in catalytic activity between compounds having a morpholine ring affects the adhesion.

In general, a compound having a plurality of (two or more) morpholine rings (polymorpholine compounds) has higher catalytic activity for a urethane prepolymer than a morpholine compound (monomorpholine compound) having one morpholine ring.

For this reason, when a composition containing the urethane prepolymer and a filler (for example, carbon black and the like) contains a polymorpholine compound, the polymorpholine compound tends to coordinates to the urethane prepolymer due to the high catalytic activity and the urethane prepolymer after the coordination has steric hindrance due to the morpholine ring, so the polymorpholine compound becomes difficult to access the filler. Thus, it is considered that the composition containing the polymorpholine compound is hardly wetted to the filler.

Here, when the filler is considered to be replaced with a base material (adherend), the composition is considered to be difficult to be wetted to the base material (adherend) and to have the low adhesion.

In addition, the present inventors estimate that an addition amount of the morpholine compound is small due to the high catalytic activity and thus the wettability is lowered.

On the other hand, when the composition containing the urethane prepolymer and the filler contains the monomorpholine compound, the monomorpholine compound has the lower catalytic activity than the polymorpholine compound, and its action on the urethane prepolymer is alleviated, whereas the urethane prepolymer is less affected by the steric hindrance due to the morpholine ring and tends to act on the filler. Thus, it is considered that the composition containing the monomorpholine compound is hardly wetted to the filler.

Here, when the filler is considered to be replaced with the base material (adherend), the composition is considered to be easily wetted to the base material (adherend) and to have the excellent adhesion.

In addition, the addition amount of the monomorpholine compound can be large due to the low catalytic activity described above. For this reason, the composition is considered to be easily wetted or more wetted to the filler and the base material.

In addition, since the composition according to the embodiment of the present technology contains an ether compound having two dimethylamino groups having the smaller steric hindrance than the morpholine ring in addition to the morpholine compound having the one morpholine ring, the composition is estimated to be wetted to the filler and the base material.

Thus, the composition according to the embodiment of the present technology is considered to have the excellent adhesion by using the morpholine compound having one morpholine ring and the ether compound having two dimethylamino groups in combination as a catalyst.

Each of the components contained in the composition according to an embodiment of the present technology will be described in detail below.

Urethane Prepolymer

The composition according to an embodiment of the present technology contains a urethane prepolymer having an isocyanate group.

An example of a preferable aspect is one in which the urethane prepolymer has an isocyanate group at a terminal thereof.

One molecule of the urethane prepolymer preferably has a plurality of isocyanate groups, and more preferably two isocyanate groups.

A content of the isocyanate group is preferably from 0.5 to 5% by mass with respect to a total amount of the urethane prepolymer.

The polyisocyanate used during production of the urethane prepolymer is not particularly limited as long as the polyisocyanate has two or more isocyanate groups in each molecule.

Examples of the polyisocyanate used in the production of the urethane prepolymer include aromatic polyisocyanates such as tolylene diisocyanate (TDI), diphenylmethane diisocyanate (MDI; for example, 4,4'-diphenylmethane diisocyanate, 2,4'-diphenylmethane diisocyanate), 1,4-phenylene diisocyanate, polymethylene polyphenylene polyisocyanate, xylylene diisocyanate (XDI), tetramethyl xylylene diisocyanate (TMXDI), tolidine diisocyanate (TODI), 1,5-naphthalene diisocyanate (NDI), and triphenylmethane triisocyanate; aliphatic polyisocyanates (including alicyclic polyisocyanates) such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatemethyl) cyclohexane (H6XDI), and di cyclohexylmethane diisocyanate (Hi2MDI); carbodiimide-modified polyisocyanates thereof; and isocyanurate modified polyisocyanates thereof.

The polyisocyanate is preferably an aromatic polyisocyanate and more preferably an MDI from the perspective of excellent curability.

The compound having two or more active hydrogen-containing groups per molecule (active hydrogen compound) that is used during production of the urethane prepolymer is not particularly limited. Examples of the active hydrogen-containing group include a hydroxy (OH) group, an amino group, and an imino group.

Preferred examples of an active hydrogen compound include a polyol compound and the like having two or more hydroxyl (OH) group in 1 molecule, and among those, a polyol compound is preferable.

The polyol compound used in the production of the urethane prepolymer is not particularly limited as long as the polyol compound is a compound having two or more hydroxy groups. Examples thereof include polyether polyols; polyester polyols; polymer polyols having a carbon-carbon bond in a main chain backbone, such as acrylic polyols, polybutadiene diols, and hydrogenated polybutadiene polyols; low molecular weight polyhydric alcohols; and mixed polyols of these. Among these, a polyether polyol is exemplified as an example of preferable aspects.

The polyether polyol is not particularly limited as long as the polyether polyol is a compound having a polyether as a main chain and having two or more hydroxy groups. The polyether is a group having two or more ether bonds, and specific examples thereof include a group having a total of two or more structural units —$R^a$—O—$R^b$—. Here, in the structural units, $R^a$ and $R^b$ each represent a hydrocarbon group independently. The hydrocarbon group is not limited. Examples thereof include a linear alkylene group having from 1 to 10 carbon atoms.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, sorbitol polyol, and the like.

The polyether polyol is preferably polypropylene glycol or polyoxypropylene triol from the perspective of excellent miscibility with polyisocyanate.

A weight average molecular weight of the polyether polyol is preferably from 500 to 20000 from the viewpoint that a viscosity of the urethane prepolymer obtained by the reaction with the isocyanate can have appropriate fluidity at a normal temperature. In the present technology, the weight average molecular weight is a value obtained by GPC analysis (solvent: tetrahydrofuran (THF)) based on calibration with polystyrene.

From the viewpoint that the adhesion and curability are more excellent, the urethane prepolymer is preferably a urethane prepolymer obtained by reacting a polyether polyol with an aromatic polyisocyanate, and more preferably a urethane prepolymer obtained by reacting at least one selected from the group consisting of polyoxypropylene diol and polyoxypropylene triol with diphenylmethane diisocyanate.

The urethane prepolymer can be used alone or in combination of two or more kinds.

The method of producing the urethane prepolymer is not particularly limited. For example, the urethane prepolymer can be produced by using polyisocyanate in a manner that from 1.5 to 2.5 mol of isocyanate group is reacted per 1 mol of the active hydrogen-containing group (e.g. hydroxy group) contained in the active hydrogen compound, and mixing these to perform a reaction.

Morpholine Compound

The morpholine compound contained in the composition according to the embodiment of the present technology has one morpholine ring.

Preferably, a hydrocarbon group which may have a hetero atom is bonded to the nitrogen atom of the morpholine ring.

The hydrocarbon group is not limited. Examples of the hydrocarbon group include an aliphatic hydrocarbon group (including linear, branched, and alicyclic types), an aromatic hydrocarbon group, and a combination thereof.

Examples of the hetero atom include an oxygen atom, a nitrogen atom, and a sulfur atom.

An example of a preferable aspect is one in which the nitrogen atom constituting the morpholine compound forms a tertiary amine.

Examples of the morpholine compound include a compound represented by Chemical Formula (1) below.

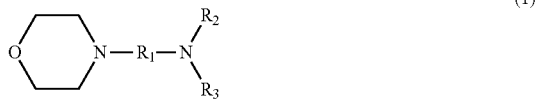

In Chemical Formula (1) above, $R_1$, $R_2$, and $R_3$ each represent a hydrocarbon group independently.

$R_1$ is preferably an alkylene group having 1 to 8 carbon atoms, and more preferably an ethylene group.

$R_2$ is preferably an alkylene group having 1 to 3 carbon atoms, and more preferably a methyl group. The same goes for $R_3$.

As the morpholine compound, dimethylaminoethyl morpholine is preferable from the viewpoint that the effect of the present technology is excellent and the yarn breakage property is excellent.

Content of Morpholine Compound

The content of the morpholine compound is preferably from 0.02 to 1.6 parts by mass and more preferably from 0.3 to 1.0 part by mass with respect to 100 parts by mass of a urethane prepolymer, from the viewpoint that the effect of the present technology is excellent and the foaming resistance, the yarn breakage property, or the storage stability is excellent.

Ether Compound

The ether compound contained in the composition according to the embodiment of the present technology is a compound having two dimethylamino groups and having an ether bond.

The ether compound does not contain the morpholine compound.

A dimethylamino group can be bonded to a hydrocarbon group bonded to an oxygen atom constituting an ether bond. The hydrocarbon group is not limited. Examples of the hydrocarbon group include an aliphatic hydrocarbon group (including linear, branched, and alicyclic types), an aromatic hydrocarbon group, and a combination thereof. Examples of the aliphatic hydrocarbon group include a (linear) alkylene group having 1 to 10 carbon atoms.

Examples of the ether compound include a compound represented by Chemical Formula (2) below.

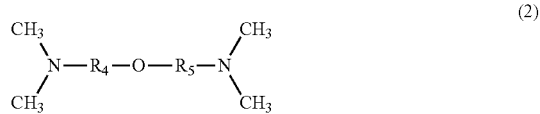

In Chemical Formula (2) above, $R_4$ and $R_5$ each represent the hydrocarbon group independently.

$R_4$ is preferably an alkylene group having 1 to 6 carbon atoms, and more preferably an ethylene group. The same goes for $R_5$.

The ether compound is preferably bis(dimethylaminoethyl) ether, from the viewpoint that the effect of the present technology is excellent and the yarn breakage property is excellent.

Content of Ether Compound

The content of the ether compound is preferably from 0.002 to 0.16 parts by mass and more preferably from 0.008 to 0.10 parts by mass with respect to 100 parts by mass of the urethane prepolymer from the viewpoint that the effect of the present technology is excellent and the yarn breakage property is excellent.

Content of Morpholine Compound and Ether Compound

Preferably, the content of the morpholine compound: x parts by mass and the content of the ether compound: y parts by mass, which are used with respect to 100 parts by mass of the urethane prepolymer, satisfy Chemical Formula (3) below, from the viewpoint that the effect of the present technology is excellent and the yarn breakage property, the foaming resistance, or the storage stability is excellent. An upper limit of x+10y is more preferably 1.7 or less from the viewpoint of the excellent yarn breakage property.

$$0.2 \leq x+10y \leq 1.8 \tag{3}$$

In Chemical Formula (3) above, x and y are both greater than 0.

Organophosphorus Compound

The composition according to the embodiment of the present technology preferably includes at least one organophosphorus compound selected from the group consisting of a phosphite compound, a phosphonite compound, a phosphinite compound, and a phosphine compound, and more preferably the phosphine compound, from the viewpoint of the excellent yarn breakage property.

An organic group of the organophosphorus compound is not particularly limited to including a phosphorus atom. Examples of the organic group include an oxygen atom, a hydrocarbon group and a combination thereof. The hydrocarbon group is not limited. Examples of the hydrocarbon group include an aliphatic hydrocarbon group (including linear, branched, and alicyclic types), an aromatic hydrocarbon group, and a combination thereof.

A hydrogen atom may be further bonded to the phosphorus atom of the organophosphorus compound, in addition to the organic group.

Phosphine Compounds

In the present specification, the phosphine compound means a compound in which at least one or all of hydrogen atoms of PH3 are substituted with a hydrocarbon group.

Examples of the phosphine compound include: a phosphine compound in which three aromatic hydrocarbon groups are bonded to a phosphorus atom, such as triphenylphosphine (TPP), tri orthotolylphosphine, trimetatolylphosphine, triparatolylphosphine, tris-4-methoxyphenylphosphine; a phosphine compound having one phosphorus atom in one molecule and three aromatic hydrocarbon groups and three aliphatic hydrocarbon groups in the phosphorus atom, such as diphenylcyclohexylphosphine, dicyclohexylphenylphosphine, and tricyclohexylphosphine; phosphine compounds having three aliphatic hydrocarbon groups in the phosphorus atom, such as trioctylphosphine and tributylphosphine; a phosphine compound having a plurality of phosphorus atoms in one molecule, such as 1,2-bis(diphenylphosphino) ethane, 1,3-bis(diphenylphosphino) propane, and 1,4-bis(diphenylphosphino) butane, and the like.

Among those, the phosphine compound is preferably a phosphine compound having at least an aromatic hydrocarbon group, more preferably a phosphine compound in which three aromatic hydrocarbon groups are bonded to a phosphorus atom, and still more preferably triphenylphosphine, from the viewpoint of the excellent yarn breakage property.

Content of Organophosphorus Compound

The content of the organophosphorus compound is preferably 0.01 to 1.0 part by mass and more preferably from 0.08 to 0.8 parts by mass with respect to 100 parts by mass of the urethane prepolymer from the viewpoint that the effect of the present technology is excellent and the yarn breakage property is excellent.

Tertiary Amine

The composition according to the embodiment of the present technology can further contain a tertiary amine.

The tertiary amine does not include the morpholine compound and the ether compound.

The tertiary amine is a compound in which three hydrocarbon groups are bonded to one nitrogen atom.

Examples of the tertiary amine include trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, triethylenediamine, 1,8-diazabicyclo [5.4.0] undecene-1, 1,4-diazabicyclo [2.2.2] octane, triethanolamine, N,N'-dimethylpiperazine, tetramethyl butanediamine, and the like.

Preferably, the content of the tertiary amine is $[(x+10y)/2]$ parts by mass or less with respect to 100 parts by mass of the urethane prepolymer, from the viewpoint that the effect of the present technology is excellent and the balance between curability, storage stability, and workability is excellent.

In the $(x+10y)/2$, x is the content (parts by mass) of the used morpholine compound with respect to 100 parts by mass of the urethane prepolymer.

In the $(x+10y)/2$, y is the content (parts by mass) of the used ether compound with respect to 100 parts by mass of the urethane prepolymer.

Metal Catalyst

The composition according to the embodiment of the present technology can further contain a metal catalyst.

The metal catalyst is not particularly limited as long as the metal catalyst is a compound capable of promoting the reaction of the isocyanate group. Examples of the metal catalyst include an organometallic catalyst and a metal catalyst (also referred to as an inorganometallic catalyst) made of only a metal having no organic group.

Examples of the metal included in the metal catalyst include tin, bismuth, titanium, and the like.

The organic group included in the organometallic catalyst is not particularly limited. Examples of the organometallic catalyst include metal carboxylates, alkoxides, and complexes. Examples of the organometallic catalyst can include at least one selected from the group consisting of a carboxylate ion, an alkyl group, a carboxylic acid, an alkoxy group, and a ligand. The carboxylate ion, the alkyl group, the carboxylic acid, the alkoxy group, and the ligand are not particularly limited.

Preferably the metal catalyst includes an organotin catalyst.

Examples of the organotin catalyst include carboxylates of tin such as dioctyltin dilaurate, dibutyltin dilaurate, dibutyltin maleate, first tin octoate, dibutyltin diacetylacetonate, and dioctyltin maleate; a reactant obtained by reacting 1,3-diacetoxy-1,1,3,3-tetrabutyl-distannoxane with ethyl silicate so that a molar ratio is 1:0.8 to 1:1.2, and the like.

The content of the metal catalyst is preferably from 0.001 to 1.0 part by mass and more preferably from 0.008 to 0.08 parts by mass with respect to 100 parts by mass of the urethane prepolymer in that the effect of the present technology is excellent.

The composition according to the embodiment of the present technology can further contain an additive. Examples of the additives include: a filler such as carbon black or calcium carbonate; a plasticizer such as diisononyl phthalate; a surface lubricant, a leveling agent, an antioxidant, a corrosion inhibitor, a light stabilizer, an ultraviolet absorber, a thixo imparting agent, and the like. The type and content of the additive can be selected appropriately.

The content of the filler is preferably from 10 to 120 parts by mass with respect to 100 parts by mass of the urethane prepolymer.

The content of the plasticizer is preferably from 10 to 120 parts by mass with respect to 100 parts by mass of the urethane prepolymer.

An example of the preferable aspects is one in which the composition according to the embodiment of the present technology does not substantially contain a compound having a plurality of morpholine rings in one molecule.

The fact that the composition according to the embodiment of the present technology does not substantially contain the compound having the plurality of morpholine rings means that the content of the compound having the plurality of morpholine rings is from 0 to 0.01 parts by mass with respect to 100 parts by mass of the urethane prepolymer.

Production Method

A production method of a composition according to the embodiment of the present technology is not particularly limited. For example, it is possible to produce the composition by mixing the above-described essential components. Optional components may be mixed as needed, in addition to the essential components described above.

Method of Use

The composition according to an embodiment of the present technology is one-part type.

The composition according to an embodiment of the present technology can be cured by moisture. The composition according to the embodiment of the present technology can be cured by the moisture in the atmosphere, for example, under conditions of −20° C. to +50° C.

In the present technology, the polyurethane of the "one-part moisture-curable polyurethane composition" means polyurethane in a broad sense, that is, a compound derived from an isocyanate group.

Examples of the use of the composition according to an embodiment of the present technology include an adhesive.

The adherend (base material) to which the composition of the technology can be applied is not particularly limited. Examples of the adherend include metal (including a coated sheet and an electrodeposition-coated steel sheet), plastic, rubber and glass.

As necessary, a primer may be used for the adherend. The primer is not particularly limited. Examples of the primer include a composition containing a compound having a hydrolyzable silyl group such as an isocyanate group and/or an alkoxysilyl group.

The composition according to the embodiment of the present technology can be used as an adhesive of a vehicle body and a window glass; and an adhesive of parts such as a rocket pin and a hinge and a window glass.

EXAMPLES

The present technology is described below in detail using examples but the present technology is not limited to such examples.

Production of Composition

The components shown in Table 1 below were used in compositions (part by mass) shown in the same table and mixed by an agitator to produce a composition.

The amount of the urethane prepolymer in Table 1 is the net amount of the urethane prepolymer.

Evaluation

The following evaluations were performed by using the composition produced as described above. The results are shown in Table 1.

Adhesion

Production of Evaluation Sample

One glass (25 mm long x 100 mm wide x 0.8 mm thick) was prepared as an adherend. Each composition produced as described above was applied to the glass at a room temperature. An electrodeposition-coated steel sheet (trade name of GT-10LF for electrodeposition paint, available from Kansai Paint Co., Ltd. No primary) overlaps the glass to crimp both the adherends. A length of a joint (portion where the electrodeposition-coated steel sheet and the glass overlap each other) between the electrodeposition-coated steel sheet and the glass was 10 mm. The thickness of the composition at the joint was 5 mm. After the crimping, the sample for evaluation was produced under conditions of 20° C. and 65% RH for 7 days.

Cycle/Vibration Composite Test

Cycle Test

First, using each of the samples for evaluation produced as described above, a cycle test was performed by repeating the following series of conditions A for 20 cycles.

Series of Conditions A

First, each of the samples for evaluation was placed under conditions of −30° C. for 3 hours, under conditions of 20° C. and 65% RH for 0.5 hours, and then under conditions of 100° C. for 20 hours, and finally, was placed under conditions of 20° C. and 65% RH for 0.5 hours. The above is referred to as a series of conditions A. The series of conditions A is one cycle.

Vibration Test

The sample for evaluation after the cycle test was subjected to a vibration test in which vibration was applied 1 million times under the conditions of a shear stress of 150 N and a frequency of 10 Hz.

Tensile Shear Test

A tensile shear test was performed under the conditions of a tensile speed of 200 mm/min and 20° C. according to JIS (Japanese Industrial Standard) K 6850:1999 using each of the samples for evaluation after the vibration test.

Evaluation Criteria of Adhesion

In each of the evaluation samples after the tensile shear test, the case where the adhesive (the portion where the composition is cured) is cohesively broken was evaluated as excellent in adhesion (long-term adhesion to weather resistance and vibration), which was represented by "good".

In each of the samples for evaluation, when the adhesive is not cohesively broken (for example, when the adhesive breaks the interface in the evaluation sample or when the samples for evaluation is broken during the vibration test), the adhesion was evaluated to be poor, which was displayed as "poor".

As described above, in the cycle/vibration composite test, a wide temperature range from −30° C. to +100° C., conditions assuming rainfall at 20° C. and 65% RH and the like are set in the cycle test, and the cycle test and the vibration test are combined, such that the cured product of the composition was exposed to various weather resistance and vibrations for a long time outdoors.

In addition, the adhesion after the cycle/vibration composite test was also evaluated as the long-term adhesion to weather resistance and vibration.

Foaming Resistance

Foaming Test

A primer (trade name M (RC-50E), available from Yokohama Rubber Co., Ltd.) was applied to an electrodeposition-coated steel sheet (trade name: GT-10LF for electrodeposition paint, Kansai Paint Co., Ltd.) having length 15 cm and width 2.5 cm.

On the other hand, a primer (trade name g (MS-90): available from Yokohama Rubber Co., Ltd.) was applied to the glass of the vertical 15 cm and the horizontal 2.5 cm.

Each of the compositions produced as described above was applied to the glass described above to which a primer was applied, and the steel plates coated with the primer were overlaid, pressed, and a sample for evaluation of foaming resistance was produced.

In the sample for evaluation of foaming resistance described above, the thickness of the composition between the glass and the steel plate was 5 mm, and the length of the overlapped portion of the glass and the steel plate was 10 cm.

The sample for evaluation of foaming resistance produced as described above was cured under, 35° C., 90% RH conditions.

A sample for evaluation of foaming resistance after curing was cut open, and the presence or absence of foaming in the cured product of the composition was visually confirmed.

Evaluation Criteria of Foaming Performance

When there was no foaming in the cured product, the foam resistance was evaluated as being excellent, and this was indicated as "good".

When the foaming was at the adhesive interface and the area of the foamed portion with respect to the entire cured product (adhesive) was 10% or less, the foam resistance was evaluated as being slightly inferior, and this was indicated as "fair".

If the foam was at the adhesive interface and the area of the foamed portion with respect to the entire cured product (adhesive) was greater than 10%, or when bubbles were observed other than at the adhesive interface, the foaming resistance was evaluated as being very poor, and this was displayed as "poor".

Yarn Breakage Property

Discharge Test

Each composition produced as described above was heated to 35° C. and charged into a robot coating apparatus. A robot coating apparatus has a nozzle, and the nozzle has a cut portion (the shape of the cut portion is an isosceles triangle with a bottom side of 8 mm and a height of 12 mm) on a side surface of a tip thereof.

Each of the compositions heated is discharged from the cut portion to the base material at a speed of 2000 g/min while moving the nozzle at a speed of 300 mm/min on the base material, and each of the compositions is imparted to the base material. The composition was imparted to the base material by means of the nozzle in the form of a triangular prism having an isosceles triangle with a bottom side of 8 mm and a height of 12 mm as a cross section.

After the discharge started, the discharge of the composition from the nozzle was stopped and the movement of the nozzle was continued as described above.

After the discharge of the composition from the nozzle was stopped, the movement of the nozzle was continued until a composition between the composition imparted to the base material and the nozzle was yarn-broken.

Measurement of Length of Composition Remaining on Tip of Nozzle

After the composition was yarn-broken, the movement of the nozzle was stopped.

After the movement of the nozzle was stopped, the length of the composition (from the cut portion of the nozzle to the tip of the composition) was measured at the tip of the nozzle. When the tip of the composition remaining on the tip of the nozzle is curled, the composition coming out of the cut portion and the nozzle are seen from the side, and the length of the composition coming out from the cut portion of the nozzle was measured along a center line of the composition coming out from the cut portion.

Evaluation Criteria of Yarn Breakage Property

When the measured length was 30 mm or less, the yarn breakage property was evaluated to be very excellent, which was represented by "good".

If the length exceeds 30 mm but is less than 50 mm, the yarn breakage property was evaluated to be somewhat excellent, which is represented by "fair".

When the length exceeds 50 mm, the yarn breakage property was evaluated to be poor, which is represented by "poor".

By achieving the excellent yarn breakage property, the composition adheres to a portion of the base material on which the application of the composition is not required and thus the base material is not contaminated with the composition and the workability is excellent.

TABLE 1

|  | Example | | | | | | |
| --- | --- | --- | --- | --- | --- | --- | --- |
|  | 1 | 2 | 3 | 4 | 5 | 6 | 7 |
| Urethane prepolymer | 100 | 100 | 100 | 100 | 100 | 100 | 100 |
| CB | 60 | 60 | 60 | 60 | 60 | 60 | 60 |
| Calcium carbonate | 40 | 40 | 40 | 40 | 40 | 40 | 40 |
| Plasticizer | 40 | 40 | 40 | 40 | 40 | 40 | 40 |
| Metal catalyst | 0.015 | 0.015 | 0.015 | 0.015 | 0.015 | 0.015 | 0.015 |
| Organophosphorus compound (TPP) |  |  |  |  |  |  |  |
| Morpholine compound 1 (X-DM) | 0.03 | 0.03 | 0.03 | 0.2 | 0.2 | 0.3 | 0.6 |
| Morpholine compound 2 (ethyl morpholine) |  |  |  |  |  |  |  |
| Ether compound 1 (BL-19) | 0.02 | 0.09 | 0.15 | 0.003 | 0.15 | 0.05 | 0.02 |
| Comparative morpholine compound (DMDEE) |  |  |  |  |  |  |  |
| Cycle/vibration composite test: adhesion | Good | Good | Good | Good | Good | Good | Good |
| Foaming resistance | Good | Good | Good | Good | Good | Good | Good |
| Discharge test: yarn breakage property | Fair | Fair | Fair | Fair | Fair | Fair | Fair |

|  | Example | | | | | | |
| --- | --- | --- | --- | --- | --- | --- | --- |
|  | 8 | 9 | 10 | 11 | 12 | 13 | 14 |
| Urethane prepolymer | 100 | 100 | 100 | 100 | 100 | 100 | 100 |
| CB | 60 | 60 | 60 | 60 | 60 | 60 | 60 |
| Calcium carbonate | 40 | 40 | 40 | 40 | 40 | 40 | 40 |
| Plasticizer | 40 | 40 | 40 | 40 | 40 | 40 | 40 |
| Metal catalyst | 0.015 | 0.015 | 0.015 | 0.015 | 0.015 | 0.015 | 0.015 |
| Organophosphorus compound (TPP) |  |  |  |  |  |  |  |
| Morpholine compound 1 (X-DM) | 0.8 | 0.9 | 1.5 | 1.6 | 1.7 | 0.05 | 0.8 |
| Morpholine compound 2 (ethyl morpholine) |  |  |  |  |  |  |  |

TABLE 1-continued

|  |  |  |  |  |  |  |  |
|---|---|---|---|---|---|---|---|
| Ether compound 1 (BL-19) | 0.08 | 0.003 | 0.02 | 0.002 | 0.01 | 0.005 | 0.11 |
| Comparative morpholine compound (DMDEE) |  |  |  |  |  |  |  |
| Cycle/vibration composite test: adhesion | Good | Good | Good | Good | Good | Good | Good |
| Foaming resistance | Good | Good | Good | Good | Good | Poor | Good |
| Discharge test: yarn breakage property | Fair | Fair | Fair | Fair | Poor | Fair | Poor |

|  | Example |  |  |  |  |  |  |
|---|---|---|---|---|---|---|---|
|  | 15 | 16 | 17 | 18 | 19 | 20 | 21 |
| Urethane prepolymer | 100 | 100 | 100 | 100 | 100 | 100 | 100 |
| CB | 60 | 60 | 60 | 60 | 60 | 60 | 60 |
| Calcium carbonate | 40 | 40 | 40 | 40 | 40 | 40 | 40 |
| Plasticizer | 40 | 40 | 40 | 40 | 40 | 40 | 40 |
| Metal catalyst | 0.015 | 0.015 | 0.015 | 0.015 | 0.015 | 0.015 | 0.015 |
| Organophosphorus compound (TPP) | 0.03 | 0.95 | 0.1 | 0.1 | 0.1 |  |  |
| Morpholine compound 1 (X-DM) | 0.6 | 0.6 | 0.9 | 0.03 | 0.8 |  | 0.01 |
| Morpholine compound 2 (ethyl morpholine) |  |  |  |  |  | 0.8 |  |
| Ether compound 1 (BL-19) | 0.02 | 0.02 | 0.003 | 0.09 | 0.08 | 0.09 | 0.02 |
| Comparative morpholine compound (DMDEE) |  |  |  |  |  |  |  |
| Cycle/vibration composite test: adhesion | Good | Good | Good | Good | Good | Good | Good |
| Foaming resistance | Good | Good | Good | Good | Good | Good | Fair |
| Discharge Test: yarn breakage property | Good | Good | Good | Good | Good | Fair | Fair |

|  | Comparative Example |  |  |  |  |  |
|---|---|---|---|---|---|---|
|  | 1 | 2 | 3 | 4 | 5 | 6 |
| Urethane prepolymer | 100 | 100 | 100 | 100 | 100 | 100 |
| CB | 60 | 60 | 60 | 60 | 60 | 60 |
| Calcium carbonate | 40 | 40 | 40 | 40 | 40 | 40 |
| Plasticizer | 40 | 40 | 40 | 40 | 40 | 40 |
| Metal catalyst | 0.015 | 0.015 | 0.015 | 0.015 | 0.015 | 0.015 |
| Organophosphorus compound (TPP) |  |  |  |  |  |  |
| Morpholine compound 1 (X-DM) |  |  |  | 0.9 | 0.6 | 0.3 |
| Morpholine compound 2 (ethyl morpholine) |  |  |  |  |  |  |
| Ether compound 1 (BL-19) | 0.09 | 0.1 | 0.1 |  |  |  |
| Comparative morpholine compound (DMDEE) |  | 0.1 | 0.6 |  | 0.1 | 0.6 |
| Cycle/vibration composite test: adhesion | Poor | Poor | Poor | Poor | Poor | Poor |
| Foaming resistance | Poor | Poor | Poor | Poor | Good | Poor |
| Discharge Test: yarn breakage property | Fair | Fair | Fair | Poor | Fair | Fair |

Details of the components described in Table 1 are as follows.

Urethane prepolymer: 500 g of polyoxypropylene diol (weight average molecular weight of 2000), 750 g of polyoxypropylene triol (weight average molecular weight of 5000), and 214 g of 4,4'-diisocyanatephenylmethane (molecular weight of 250) were mixed (at this time, NCO/OH=1.8), 160 g of diisononyl phthalate was further added thereto, and the mixture reacted while stirring at 80° C. for 24 hours in a nitrogen gas stream to synthesize the urethane prepolymer containing 1.95% of isocyanate group.

CB: Carbon black, trade name: Niteron #200, manufactured by Nippon Steel Carbon Co., Ltd.

Calcium carbonate: Heavy calcium carbonate, trade name Super SS, manufactured by Maruo Calcium Co., Ltd.

Plasticizer: Diisononyl phthalate

Metal catalyst: Dioctyltin laurate (NEOSTANN U-810, manufactured by Nitto Kasei Co., Ltd.)

Organophosphorus compound (TPP): Triphenylphosphine, manufactured by Johoku Chemical Co., Ltd.

Morpholine compound 1 (X-DM): Dimethylaminoethyl morpholine, trade name X-DM, manufactured by Air Products Limited.

Morpholine compound 2 (ethyl morpholine): Ethyl morpholine, manufactured by Kanto Kagaku.

Ether compound 1 (BL-19): bis(dimethylaminoethyl) ether, trade name BL-19, manufactured by Air Products Limited.

Comparative morpholine compound (DMDEE): Dimorpholino diethylether (Manufactured by San-Apro Ltd.)

As apparent from the results shown in Table 1, Comparative Example 1 containing no predetermined morpholine compound had low adhesion.

Further, Comparative Examples 2 and 3 which do not contain a predetermined morpholine compound but instead contain a compound having a plurality of morpholine rings and contain a predetermined ether compound had low adhesion.

Comparative example 4 which does not contain a predetermined an ether compound had low adhesion.

Further, Comparative Examples 5 and 6 which contain a predetermined morpholine compound and a compound having a plurality of morpholine rings and do not contain a predetermined ether compound had low adhesion.

On the contrary, the composition according to the embodiment of the present technology is excellent in adhesion.

In addition, when the composition according to the embodiment of the present technology further contains a predetermined organophosphorus compound (Examples 15 to 19), the composition had the more excellent yarn breakage property than when the composition does not contain the organophosphorus compound (Examples 1 to 14, 20, and 21).

From the comparison of Examples 1 to 11 with Example 12, the content of the morpholine compound is from 0.02 to 1.6 parts by mass with respect to 100 parts by mass of the urethane prepolymer, and/or when in the above Chemical Formula (3), x+10y is 1.7 or less (Examples 1 to 11), the content of the morpholine compound is 1.7 parts by mass, and when x+10y is 1.8 (Example 12), the yarn breakage property was more excellent.

From the comparison of Examples 1 to 11 with Examples 13 and 14, the foaming resistance or the yarn breakage property is more excellent when the contents of the morpholine compound and the ether compound satisfy Chemical Formula (3) above than when the contents of the morpholine compound and the ether compound do not satisfy Chemical Formula (3) above (Examples 13 and 14).

The invention claimed is:

1. A one-part moisture-curable polyurethane composition, comprising:
    a urethane prepolymer having an isocyanate group;
    a morpholine compound having one morpholine ring;
    an ether compound having two dimethylamino groups; and
    from 0 to 0.01 parts by mass of a compound having a plurality of morpholine rings in one molecule with respect to 100 parts by mass of the urethane prepolymer.

2. The one-part moisture-curable polyurethane composition according to claim 1, wherein
    a content of the morpholine compound is from 0.02 to 1.6 parts by mass with respect to 100 parts by mass of the urethane prepolymer, and
    a content of the ether compound is from 0.002 to 0.16 parts by mass with respect to 100 parts by mass of the urethane prepolymer.

3. The one-part moisture-curable polyurethane composition according to claim 1, wherein the morpholine compound is dimethylaminoethyl morpholine.

4. The one-part moisture-curable polyurethane composition according to claim 1, wherein the ether compound is bis(dimethylaminoethyl) ether.

5. The one-part moisture-curable polyurethane composition according to claim 1, further comprising: at least one organophosphorus compound selected from the group consisting of a phosphite compound, a phosphonite compound, a phosphinite compound, and a phosphine compound.

6. The one-part moisture-curable polyurethane composition according to claim 5, wherein a content of the organophosphorus compound is from 0.01 to 1.0 part by mass with respect to 100 parts by mass of the urethane prepolymer.

7. The one-part moisture-curable polyurethane composition according to claim 5, wherein the organophosphorus compound is triphenylphosphine.

8. The one-part moisture-curable polyurethane composition according to claim 6, wherein the organophosphorus compound is triphenylphosphine.

9. The one-part moisture-curable polyurethane composition according to claim 2, wherein the morpholine compound is dimethylaminoethyl morpholine.

10. The one-part moisture-curable polyurethane composition according to claim 2, wherein the ether compound is bis(dimethylaminoethyl) ether.

11. The one-part moisture-curable polyurethane composition according to claim 2, further comprising: at least one organophosphorus compound selected from the group consisting of a phosphite compound, a phosphonite compound, a phosphinite compound, and a phosphine compound.

12. The one-part moisture-curable polyurethane composition according to claim 11, wherein a content of the organophosphorus compound is from 0.01 to 1.0 part by mass with respect to 100 parts by mass of the urethane prepolymer.

13. The one-part moisture-curable polyurethane composition according to claim 11, wherein the organophosphorus compound is triphenylphosphine.

14. The one-part moisture-curable polyurethane composition according to claim 12, wherein the organophosphorus compound is triphenylphosphine.

15. The one-part moisture-curable polyurethane composition according to claim 3, wherein the ether compound is bis(dimethylaminoethyl) ether.

16. The one-part moisture-curable polyurethane composition according to claim 3, further comprising: at least one organophosphorus compound selected from the group consisting of a phosphite compound, a phosphonite compound, a phosphinite compound, and a phosphine compound.

17. The one-part moisture-curable polyurethane composition according to claim 16, wherein a content of the organophosphorus compound is from 0.01 to 1.0 part by mass with respect to 100 parts by mass of the urethane prepolymer.

18. The one-part moisture-curable polyurethane composition according to claim 16, wherein the organophosphorus compound is triphenylphosphine.

19. The one-part moisture-curable polyurethane composition according to claim 17, wherein the organophosphorus compound is triphenylphosphine.

20. The one-part moisture-curable polyurethane composition according to claim 4, further comprising: at least one organophosphorus compound selected from the group consisting of a phosphite compound, a phosphonite compound, a phosphinite compound, and a phosphine compound.

* * * * *